May 10, 1938.   W. J. OESTERLEIN   2,117,035
WELDING GENERATOR
Filed June 13, 1935   2 Sheets-Sheet 1

INVENTOR.
William J. Oesterlein
BY
Louis Quarles
ATTORNEY.

May 10, 1938.  W. J. OESTERLEIN  2,117,035
WELDING GENERATOR
Filed June 13, 1935  2 Sheets-Sheet 2

INVENTOR.
William J. Oesterlein
BY Louis Quarles
ATTORNEY.

Patented May 10, 1938

2,117,035

UNITED STATES PATENT OFFICE 2,117,035

WELDING GENERATOR

William J. Oesterlein, Wauwatosa, Wis., assignor to Harnischfeger Corporation, Milwaukee, Wis., a corporation of Wisconsin Application June 13, 1935, Serial No. 26,354

6 Claims. (Cl. 171—221)

This invention relates to electrical generating equipment suitably controlled for welding purposes and it comprises an electric generator driven by an appropriate source of power, which generator is controllable in its output through angular adjustment of its commutator brushes, said brush adjusting means being driven by an actuator, including controls therefor for the starting, stopping and reversal thereof, said controls being borne by a portable mounting locatable at will at the site of welding, said brush adjusting means further being engaged cooperatively by the transmitting member of a remote reading position indicator, the receiving member of which is located in said portable mounting and at times, if desirable, said portable mounting may also bear controls for starting and stopping the main source of power, and also for reversing the polarity of generator output.

The object of this invention is to provide an arc-welding apparatus, wherein output is varied by shifting of brushes, having a portable control, which may be brought to the work without the necessity of moving the entire generator and its drive. With the apparatus of this invention the operator may stay at his work and nevertheless make such necessary changes in brush setting as the work requires. For this purpose it is necessary that means be provided both for shifting the brushes and indicating the location thereof. The two necessary and related requirements are met in this invention through electrical means actuatable through an easily portable, flexible cable. The operator may conveniently station the portable mounting upon which the control and indicating devices are mounted and proceed with the work of welding, making the necessary adjustments of the generator without leaving the work.

Other improvements and advantages residing in the invention are indicated in the following description of one form of the invention in which description reference is made to the accompanying drawings, wherein—

Figure 1:
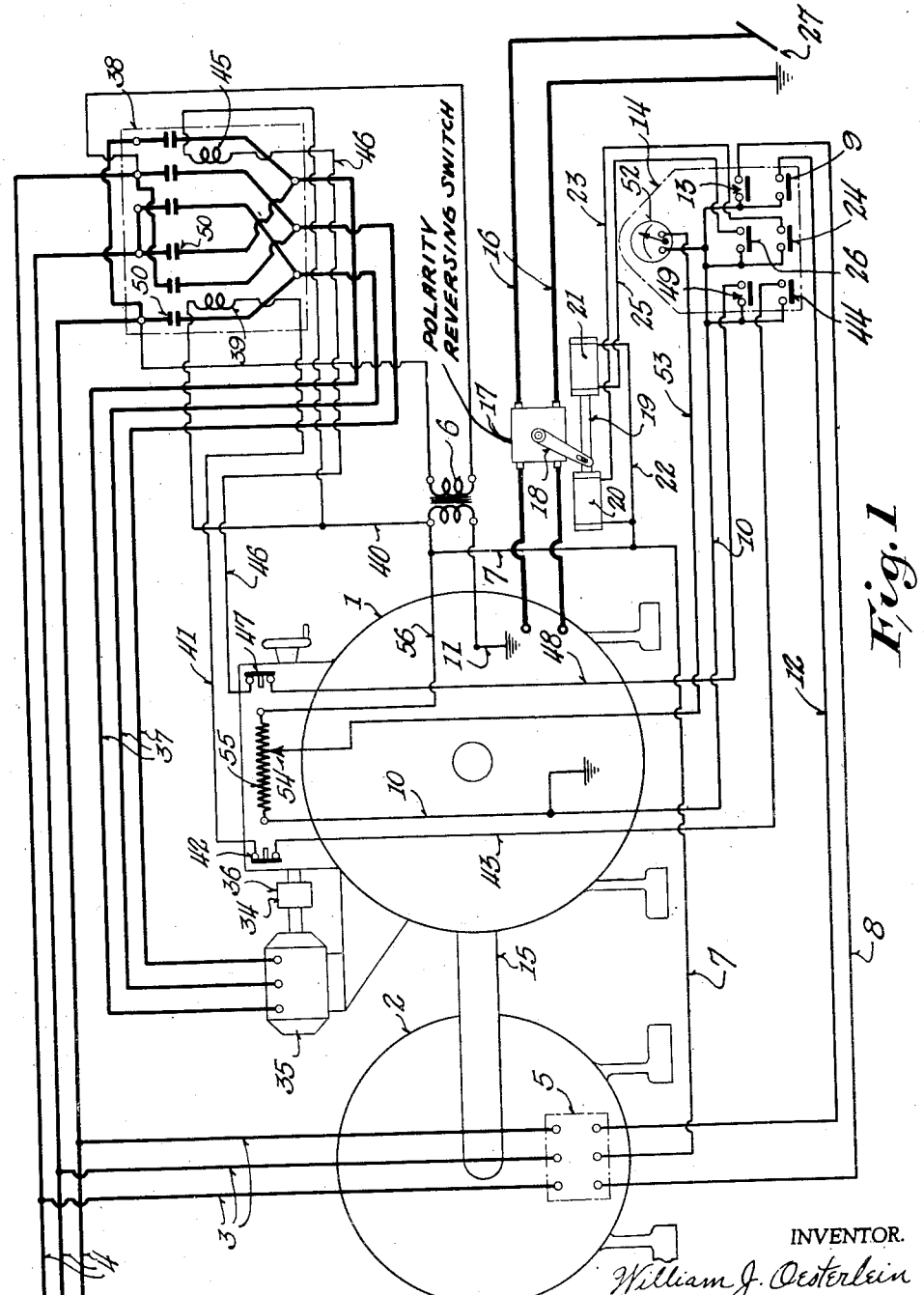
Fig. 1 is a wiring diagram of one form of the invention.

In Fig. 1 generator 1 and a driving motor 2 are shown in outline, the motor being supplied through supply lines 3 which lead to the main supply 4, which in this case is a standard three-phase alternating current supply, although any suitable system of supply is contemplated.

The lines 3 lead to a starting box 5, of standard construction, for starting and stopping the motor 2. Starting and stopping is accomplished through push-button control, the control power for which is supplied by a transformer 6 through a common supply line 7. During starting the supply from line 7 is returned through line 8 and a push-button 9 to a ground line 10 and thence through a ground 11 to the transformer 6. During stopping the control current from supply line 7 returns through a line 12 and a push-button 13 to the ground line 10 and thence through ground 11 to the transformer 6. The push-buttons 9 and 13 are borne on a mounting 14, which is described in detail hereinafter.

The motor 2 through a drive 15 supplies driving energy to the generator 1. The details of the construction of generator 1 form no part of this invention aside from the fact that it is suitably wound and constructed for the supply of arc-welding current and is of the type wherein control is obtained by angular adjustment of the commutator brushes. The means for obtaining such angular adjustment may take a wide variety of mechanical forms, one form of which is shown in detail in Fig. 2.

The output of generator 1 is supplied to the welding leads 16 interposed in which is a polarity reversing switch 17. The switch 17 is actuated by a lever 18 which in turn is shifted by a solenoid core acting between solenoids 20 and 21. Current is supplied to the solenoids 20 and 21 through lead 22 which makes connection with the common supply lead 7 from the transformer 6. The return from solenoid 20 is through a line 23 and push-button 24 to the ground return 10 and thence back to the transformer 6. The return from solenoid 21 in a similar manner is through lead 25 and push-button 26, and thence through ground return 10 back to the transformer 6. The push-buttons 24 and 26 are borne by the mounting 14 above referred to. By actuation of push-buttons 24 or 26 the polarity supplied to the welding end 27 of the welding leads 16 can be reversed at will, and through the actuation of push-buttons 9 and 13 the motor 2 and driving generator 1 may be started or stopped at will.

The work performed at welding end 27 is by nature variable in character and requires appropriate current supply for each particular class of welding encountered, and to this end the apparatus of this invention provides means for varying the output of generator 1 through the shifting of the angular relationship of the commutator brushes to the generator field.

Figure 2:
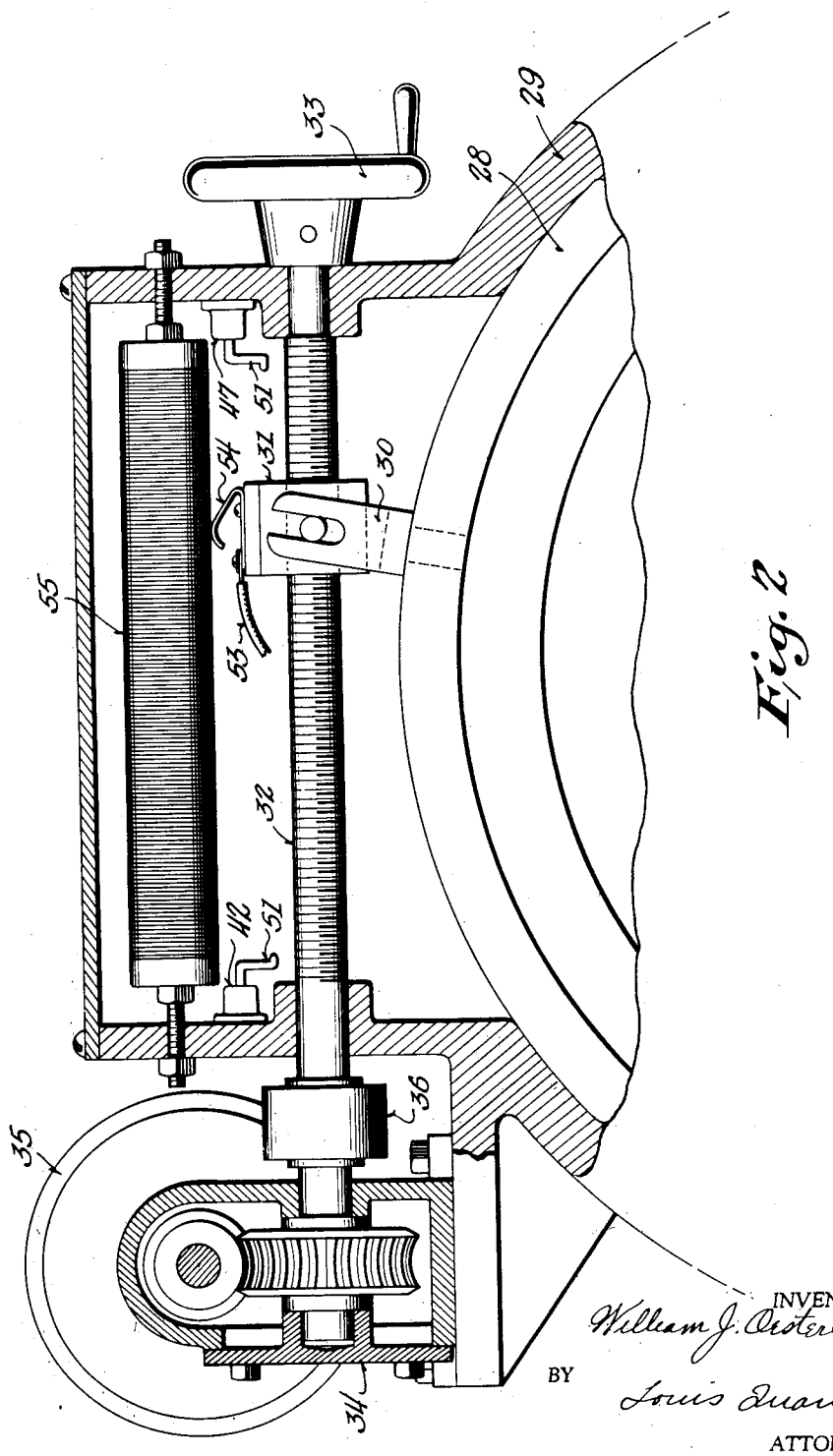
Fig. 2 is a detailed, sectional view of the brush-controlling mechanism and transmitting member of the position-indicating mechanism of one form of the machine of this invention.

As shown in Fig. 2, a rotatable brush-bearing ring 28 is mounted to turn in the main generator housings 29 and is controlled in its movement by the fork 30 which engages pins projecting from a nut 31 mounted upon an adjusting screw 32. The adjusting screw 32 may be manually operated by means of a hand-wheel 33, or may be mechanically operated through a friction clutch 36 which is driven by a motor 35 through a reducer 34 so that independent adjustment by means of the hand-wheel 33 may be accomplished when desired.

The motor 35, as shown in Fig. 1, is supplied through lines 37 which lead through a reversing-box 38 to the main supply lines 4. The motor 35 is shown diagrammatically and in outline in Fig. 1, the reduction drive 34 and the clutch 36 being shown conventionally in Fig. 1. The motor 35 is indicated as a three-phase motor, but for the purposes of this invention any suitable form of motor may be employed, together with appropriate reversing switches.

The reversing-box 38 is actuated for forward movement by a coil 39 receiving energizing current through line 40 which extends to the transformer 6. The return from coil 39 is through line 41 and limit-switch 42, line 43, push-button 44, and the ground return 10, and thence through ground 11 back to the transformer 6. Reversing-box 38 for return movement is actuated by a coil 45 which receives energizing current from supply lines 40 in the same manner as coil 39, and the return from coil 45 passes through line 46 to limit-switch 47 and thence through line 48 to push-button 49, and thence through the ground return 10 and the ground 11 to the transformer 6.

When push-button 44 is actuated, coil 39 becomes energized and the reversing-box 38 makes a connection through contacts 50 with the leads 37 to motor 35, causing the driving of the screw 32 and the shifting to the left of the fork 30 and consequently the counterclockwise rotation of the brush-holder 28. This movement continues as long as button 44 is depressed and ceases upon the breaking of the circuit at button 44. In the event the operator carelessly prolongs the depression of button 44, the nut 31, as shown clearly in Fig. 2, engages the foot 51 of the limit-switch 42, breaking the control circuit and stopping the movement of motor 35. Shifting of the brushes in the opposite direction is accomplished in exactly similar manner through the depressing of push-button 49 and protection against overrunning is provided by limit-switch 47.

Push-buttons 44 and 49 are borne by the mounting 14, which mounting also carries a special calibrated galvanometer 52, one terminal of which makes connection with the ground return 10 and thence through ground 11 to the transformer 6. The other terminal of the galvanometer is connected through line 53 with a sliding contact 54, shown more in detail in Fig. 2. The sliding contact 54 is carried by and moves with nut 31 and at the same time bears against a slide wire resistance 55, as shown in Fig. 1. The ends of slide wire resistance 55 are continuously supplied with current from the transformer 6 through ground return 10 and a lead 56.

The total resistance of element 55 is adjusted to such a value that a very moderate and continuous current is drawn from the transformer 6, such current being sufficiently small so that no heat dissipating problem arises. For example, if the output of transformer 6 is 110 volts, the resistance of element 55 may suitably be in the neighborhood of 300 ohms.

The galvanometer is so wound that when the contact 54 is at the extreme left zero deflection is indicated and when the contact 54 is at the extreme right full scale deflection is shown. The intervening space on the scale of the galvanometer may be divided in any manner desired, for example, by stating thereon the nominal output in amperes of the generator 2 for each corresponding position of the brush holder 28, it being understood that the intermediate deflections of the galvanometer correspond directly with intermediate stations of the nut 31.

The mounting 14 may be any suitable small panel with an appropriate base or casing, preferably compact and light in weight so that it may be of a distinctly portable nature. Connecting with the mounting 14, as shown clearly in Fig. 1, are the lines 8, 12, 43, 48, 10, 53, 25, and 23. These lines are preferably all stranded into one flexible cable, the length of which may be arranged so that access to all parts of an average shop may be had. In certain cases it may not be necessary to include the reversing switch 17 and the attendant lines 23 and 25, as well as the starting-box 5, with its attendant lines 8 and 12. In such case the mounting 14 will be simplified and will carry the galvanometer 52 and the brush-shifting push-buttons 49 and 44. It is also contemplated that in cases where the generator 1 is driven by a prime mover, such as an internal combustion engine, any suitable stopping and starting mechanism therefor may be employed. For example, push-button 9 might serve to close a starter switch, while push-button 13 might serve to interrupt the ignition system. In like manner, if the generator be of the type wherein the output is controlled through alteration of field resistance, or through regulation of exciter current, the adjusting screw 32, and the nut 31 may serve to actuate the variable resistance involved.

The remote indicating circuit described above is of the potentiometer type, depending for its accuracy upon a relatively constant potential current supply. For the purpose of this invention ordinary line regulation is adequate and, as shown in Fig. 1, the supply is provided through the transformer 6 connected to regular current supply. In case, however, that the generator 1 is driven by a prime mover, such as an internal combustion engine, suitable constant potential supply may ordinarily be obtained from the starting battery used to start the prime mover. In some cases also where the generator is provided with an exciter, a suitable supply for this purpose may be obtained. It is obvious, however, that any of the various well-known forms of remote indicating circuits may be employed as the equivalent of the one specific form described above in connection with this invention, and it is contemplated that any one of such equivalent circuits may be employed.

The apparatus of this invention has been described above in connection with one specific form thereof, but it is intended that the protection of Letters Patent to be granted hereon be not unnecessarily limited thereby, but extend to the full scope of the invention as represented by the scope of the claims appended hereto.

What I claim as my invention is:

1. In an electric generator for electric welding, the combination comprising a generator having a field and brushes angularly shiftable with respect thereto, a motor for driving said generator, electrically energized means for stopping and starting said motor, motor-driven means for shifting said brushes, a portable mounting carrying means for stopping, starting, and reversing said motor-driven brush-shifting means, controllable means also borne by said portable mounting for energizing said motor-stopping and starting means, transmitting means for a remote indicating apparatus cooperatively arranged with respect to said brushes to be actuated by the shifting thereof, and receiving means for said remote position-indicating apparatus mounted upon said portable mounting.

2. In an electric generator for electric welding, the combination comprising a generator having a field and brushes angularly shiftable with respect thereto, motor-driven means for shifting said brushes, a portable mounting carrying means for stopping, starting, and reversing said motor-driven means, an electrically actuated polarity reversing switch connected to the output of said generator, control means for the actuation of said polarity reversing switch also carried by said portable mounting, transmitting means for a remote indicating apparatus cooperatively arranged with respect to said shiftable brushes to be actuated thereby, and receiving means for said remote position indicating apparatus also mounted upon said portable mounting.

3. In an electric generator for electric welding, the combination comprising a generator having a field and brushes angularly shiftable with respect thereto, a motor for driving said generator, electrically energized means for stopping and starting said motor, a polarity reversing switch connected with the output of said generator, electrically energized means for actuating said polarity reversing switch, motor-driven means for shifting said shiftable brushes, a portable mounting carrying means for stopping, starting, and reversing said motor-driven brush-shifting means, control means for said electrically energized means for stopping and starting said driving motor also carried upon said portable mounting, control means for said electrically actuated polarity reversing switch also borne by said portable mounting, transmitting means for a remote indicating apparatus cooperatively arranged with respect to said shiftable brushes to be actuated thereby, and receiving means for said remote position indicating apparatus also mounted upon said portable mounting.

4. In an electric generator for electric welding wherein control of welding currents is effected by shifting the brushes, the combination comprising a housing for said generator, a circular shiftable mounting for said brushes, a screw rotatably held with respect to said housing and tangent thereto, a nut threadedly engaging said screw, means associated with said brush mounting and cooperatively engaging said nut, hand means for rotating said screw, and a reversible motor engaging said screw through a friction drive.

5. In an electric generator for electric welding wherein control of welding currents is effected by shifting the brushes, the combination comprising a housing for said generator, a circular shiftable mounting for said brushes, a screw rotatably held with respect to said housing and tangent thereto, a nut threadedly engaging said screw, means associated with said brush mounting and cooperatively engaging said nut, hand means for rotating said screw, a resistance element rigidly fixed with respect to said housing and parallel with said screw, a sliding contact carried by said nut and bearing against said resistance element, conductors connecting the ends of said resistance element with a source of electric current of constant potential, a conductor connecting one end of said resistance element with the galvanometer, a conductor connecting said sliding contact also with said galvanometer, limit switches engageable by said nut at the extremities of the movement thereof, a reversible motor, a friction clutch connecting said motor with said aforementioned screw, and means for supplying said motor with driving current through said limit switches.

6. In an electric generator, the combination comprising shiftable means for regulating the output of said generator, a reversible motor drivingly connected to said shiftable means and adapted to shift the same, an electrical position-transmitting means associated with said shiftable means for movement in consonance therewith to vary the electrical characteristics thereof, a flexible cable carrying control leads connected to said reversible motor for control thereof and also carrying leads connected to said electrical position-transmitting means, and a portable mounting secured to the end of said flexible cable and carrying a switch for completing the driving circuits of said reversible motor, and an electrical position-receiving means connected to said leads which connect with said position-transmitting means.

WILLIAM J. OESTERLEIN.